US012191772B2

(12) United States Patent
Lin et al.

(10) Patent No.: US 12,191,772 B2
(45) Date of Patent: Jan. 7, 2025

(54) DIRECT CURRENT POWER SUPPLY SYSTEM FOR URBAN RAIL TRANSIT CASCADED DIRECT-HANGING STATIONS

(71) Applicants: Guangzhou Metro Design&Research Institute Co.,Ltd., Guangdong (CN); QINGDAO UNIVERSITY, Shandong (CN)

(72) Inventors: Shan Lin, Guangdong (CN); Tao Zhao, Shandong (CN); Xingzhong Nong, Guangdong (CN); Dijun Wang, Guangdong (CN); Chunfang Wang, Shandong (CN)

(73) Assignees: Guangzhou Metro Design & Research Institute Co., Ltd., Guangdong (CN); QINGDAO UNIVERSITY, Shandong (CN)

( * ) Notice: Subject to any disclaimer, the term of this patent is extended or adjusted under 35 U.S.C. 154(b) by 70 days.

(21) Appl. No.: 18/314,809

(22) Filed: May 9, 2023

(65) Prior Publication Data
US 2024/0380328 A1  Nov. 14, 2024

(51) Int. Cl.
*H02M 3/335* (2006.01)
*H02B 1/20* (2006.01)
*H02J 1/00* (2006.01)
*H02M 7/219* (2006.01)

(52) U.S. Cl.
CPC .......... *H02M 3/3353* (2013.01); *H02B 1/20* (2013.01); *H02J 1/00* (2013.01); *H02M 7/219* (2013.01)

(58) Field of Classification Search
CPC .................................................. H02M 3/3353

USPC ............................................................. 307/18
See application file for complete search history.

(56) References Cited

U.S. PATENT DOCUMENTS

| 6,340,851 B1* | 1/2002 | Rinaldi ................... H02P 27/16 |
| | | 307/82 |
| 2016/0303987 A1* | 10/2016 | Kawamura ............. B60L 53/20 |
| 2023/0268733 A1* | 8/2023 | Reimann ................... H02J 1/10 |
| | | 307/18 |

(Continued)

FOREIGN PATENT DOCUMENTS

CN         114884047        8/2022

*Primary Examiner* — Joseph Chang
(74) *Attorney, Agent, or Firm* — JCIPRNET

(57) ABSTRACT

The present invention discloses a direct current power supply system for urban rail transit cascaded direct-hanging stations, belonging to the field of power electronic technologies. The power supply system includes a 110 kV high-voltage power grid, a 35 kV medium-voltage power grid, a cascaded H-bridge medium-voltage direct-hanging converter, a 650V-800V common direct current bus, a standby power supply and direct current electric loads. The cascaded H-bridge medium-voltage direct-hanging converter is formed by 3n modules in cascade, and each module is formed by an H-bridge converter and an isolated DC/DC converter connected in series. The present invention can replace an alternating current load power supply system based on a power frequency transformer, improve the efficiency and power density of the load power supply system of a subway station, reduce the no-load loss and extra cost introduced by the power frequency transformer, and achieve the purposes of energy saving, emission reduction and cost saving.

4 Claims, 6 Drawing Sheets

(56) References Cited

U.S. PATENT DOCUMENTS

2023/0369958 A1\* 11/2023 Zhuang ................ H02M 7/217
2023/0387780 A1\* 11/2023 Zhuang ............. H02M 3/33561

\* cited by examiner

DIRECT CURRENT POWER SUPPLY SYSTEM FOR URBAN RAIL TRANSIT CASCADED DIRECT-HANGING STATIONS

BACKGROUND

1. Technical Field

The present invention relates to a direct current power supply system for urban rail transit cascaded direct-hanging stations, belonging to the field of power electronic technologies.

2. Description of Related Art

At present, the power supply system widely used in subway stations at home and abroad is an alternating current power supply system for loads in a station based on the power frequency transformer as shown in FIG. 1. Specifically, a main transformer substation steps down 110 kV alternating current to 35 kV through the power frequency transformer, and then transmits to all subway stations. The main transformer substation is equipped with a static var generator (SVG) apparatus to compensate the reactive power consumption of all stations of a whole subway line to meet the requirements of grid connection. At each subway station, the power supply system is mainly divided into two parts, one part is the traction power supply for locomotives, and the other part is the power supply for other loads in the station, such as a ventilation and air conditioning system, a water supply and drainage system, a firefighting system, an escalator system, a communication and information system, an operation control system, an automatic fare collection system and a lighting system in the station. In addition, the subway station should also be equipped with a subway emergency power supply system therein, that is, an emergency power supply (EPS), an uninterruptible power supply (UPS), etc. In the alternating current power supply system, when the main power supply system fails, the UPS and EPS are quickly activated to undertake the task of power supply, so as to prevent the subway from being forced to stop due to the failure of the main power supply system, no power supply for the loads in the station and other problems, and ensure that the facilities in the subway station can still operate normally when the main power supply system fails. In the main power supply system, the subway traction system uses a 24-pulse rectifier unit to provide a traction voltage after being stepped down by the power frequency transformer. The technology is relatively mature and can basically meet the needs of current applications. However, the power supply system for other loads in the subway station and the traction power supply are independent of each other, so that it is necessary to step down the 35 kV medium-voltage power grid to a commercial power level through the power frequency transformer at first, and then supply to various loads in the station.

However, the use of such a power supply mode requires to equip a large number of power step-down transformers, the power step-down transformers work at a power frequency and contain a lot of materials such as copper and iron, which are not only bulky and heavy, but also have the disadvantages such as high no-load loss at night and high reactive power consumption. By taking the transformer with a capacity of 1 MVA as an example, the no-load loss is 1.6 kW, and if the daily average no-load time is calculated as 10 hours, then the daily power consumption is 16 kWh/MW. By taking the subway line with 20 platforms as an example, the no-load loss of power distribution transformers is about $133.16 \times 104$ kWh/year, and the no-load loss of the transformers in one subway line is equivalent to about 200 tons of standard coal in one year. According to the calculation of 0.008 ton of sulfur dioxide and 2.6 tons of carbon dioxide per ton of standard coal, 1.6 tons of sulfur dioxide and 520 tons of carbon dioxide are emitted each year. Considering all the subway lines in operation in the country, this will be a very impressive figure.

In summary, the existing alternating current power supply system for the loads in the subway stations has the following problems:

1. In the alternating current power supply system, it is inevitable to equip a large number of power frequency transformers, and the power frequency transformers contain a lot of materials such as copper and iron, which are bulky and heavy, making it relatively difficult to install and maintain the power step-down transformers. Secondly, the power frequency transformer still has larger no-load loss.
2. The application of a large number of power frequency transformers makes the reactive power consumption in the subway station larger. In order to meet the requirements of grid connection, the reactive power to be compensated is also larger, and then the SVG capacity required to be equipped in the main transformer substation is larger, which increases an investment cost of the subway station.

SUMMARY

The technical problem to be solved by the present invention is to overcome the limitations of the above alternating current power supply system and provide a direct current power supply system for urban rail transit cascaded direct-hanging stations. That is to say, direct current power is supplied to various electrical devices in the subway station, and a large number of power frequency transformers are removed fundamentally, so as to avoid the huge no-load loss caused by the power frequency transformers and realize energy saving and emission reduction. Moreover, the cascaded modular medium-voltage converter can use a power factor correction (PFC) technology to compensate the reactive power in the station, without a need to equip SVG devices, thereby reducing the investment cost.

In order to achieve the above objective, the technical solution adopted by the present invention is as follows:

A direct current power supply system for urban rail transit cascaded direct-hanging stations includes a 110 kV high-voltage power grid, a 35 kV medium-voltage power grid, three identical filter inductors L, a cascaded H-bridge medium-voltage direct-hanging converter, a 650V-800V common direct current bus, an emergency power supply system and electric loads in a subway station; a step-down transformer is installed between the 110 kV high-voltage power grid and the 35 kV medium-voltage power grid.

The cascaded H-bridge medium-voltage direct-hanging converter is divided into three phases with the same structure, which are respectively marked as an A-phase cascaded H-bridge medium-voltage direct-hanging converter, a B-phase cascaded H-bridge medium-voltage direct-hanging converter and a C-phase cascaded H-bridge medium-voltage direct-hanging converter.

Each phase of the A-phase cascaded H-bridge medium-voltage direct-hanging converter, the B-phase cascaded H-bridge medium-voltage direct-hanging converter and the C-phase cascaded H-bridge medium-voltage direct-hanging converter includes n modules $\Gamma_{mi}$ with the same structure, such that the cascaded H-bridge medium-voltage direct-hanging converter includes 3n modules $\Gamma$mi with the same structure in total, wherein m represents a phase sequence, m=A, B, C, i represents a serial number of the modules $\Gamma_{mi}$, i=1, 2, 3 . . . n, and n is a positive integer greater than 1.

Each of the modules $\Gamma_{mi}$ is formed by an H-bridge converter and an isolated DC/DC converter connected in series, and a direct current-side filter capacitor $C_{mi0}$ of the H-bridge converter is connected in parallel at a direct current output end of the H-bridge converter.

The H-bridge converter is formed by two bridge arms connected in parallel, each bridge arm includes two switch tubes with anti-parallel diodes, such that the H-bridge converter includes four switch tubes with anti-parallel diodes in total, and these four switch tubes are marked as switch tubes $S_{mij}$, wherein j represents a serial number of the switch tube, and j=1, 2, 3, 4. In the two bridge arms of the H-bridge converter, a source electrode of the switch tube $S_{mi1}$ is connected with a drain electrode of the switch tube $S_{mi2}$, and a connection point thereof is marked as point $\sigma_{mi1}$. A source electrode of the switch tube $S_{mi3}$ is connected with a drain electrode of the switch tube $S_{mi4}$, a connection point thereof is marked as point $\sigma_{mi2}$, and the points $\sigma_{mi1}$ and $\sigma_{mi2}$ form an alternating current input end of each of the modules $\Gamma_{mi}$.

In each phase of the cascaded H-bridge medium-voltage direct-hanging converter, the alternating current input ends of n modules $\Gamma_{mi}$ are cascaded, such that in the cascaded H-bridge medium-voltage direct-hanging converter, three module strings formed by the n modules $\Gamma_{mi}$ are formed, certain ends of the three module strings are connected together to form a common point, and the other ends of the module strings are respectively connected with the 35 kV medium-voltage power grid that is three-phase star-connected through one filter inductor L.

In the cascaded H-bridge medium-voltage direct-hanging converter, direct current output ports of the 3n modules $\Gamma_{mi}$ are connected in parallel to form one 650V-800V common direct current bus.

The electric loads in the subway station include alternating current loads and direct current loads, the alternating current loads at least include a ventilation and air conditioning system, a water supply and drainage system, a firefighting system and an escalator system, and the direct current loads at least include a communication and information system, an operation control system and an in-station lighting system. Input ends of the ventilation and air conditioning system, the water supply and drainage system, the firefighting system and the escalator system are respectively connected with the 650V-800V common direct current bus, and respectively convert direct current into alternating current by self-contained frequency modulation control apparatuses for operation. Input ends of the communication and information system, the operation control system and the in-station lighting system are respectively connected with the 650V-800V common direct current bus, and are respectively supplied with power through self-contained direct current converters.

The emergency power supply system includes a non-isolated DC/DC converter and a standby power supply, wherein an output end of the non-isolated DC/DC converter is connected with the 650-800 V common direct current bus, and an input end of the non-isolated DC/DC converter is connected with an output end of the standby power supply.

Preferably, the isolated DC/DC converter is a dual active bridge (DAB) converter; a circuit topological structure of the DAB converter sequentially includes a primary side inverter bridge, an energy storage inductor $L_{mi0}$, a high-frequency isolation transformer $T_{mi}$, a secondary side controllable rectifier bridge and a direct current bus filter capacitor $C_{mi1}$ from input to output.

The primary side inverter bridge is formed by two bridge arms connected in parallel, each of the two bridge arms of the primary side inverter bridge includes two switch tubes with anti-parallel diodes, such that the primary side inverter bridge includes four switch tubes with anti-parallel diodes in total, and the four switch tubes are marked as switch tubes $Q_{mij}$. The secondary side controllable rectifier bridge is formed by two bridge arms connected in parallel, each of the two bridge arms of the secondary side controllable rectifier bridge includes two switch tubes with anti-parallel diodes, such that the secondary inverter bridge includes four switch tubes with anti-parallel diodes in total, and the four switch tubes are marked as switch tubes $Q_{mih}$, wherein h is a serial number of the switch tube, and h=5, 6, 7, 8. Each switch tube $Q_{mij}$ in the primary side inverter bridge is connected in parallel with one parasitic capacitor; each switch tube $Q_{mih}$ in the secondary side controllable rectifier bridge is connected in parallel with one parasitic capacitor.

In the two bridge arms of the primary side inverter bridge, the switch tube $Q_{mi1}$ and the switch tube $Q_{mi2}$ are connected in series to form one bridge arm, the switch tube $Q_{mi3}$ and the switch tube $Q_{mi4}$ are connected in series to form the other bridge arm. Specifically, a source electrode of the switch tube $Q_{mi1}$ is connected with a drain electrode of the switch tube $Q_{mi2}$, a connection point thereof is connected with one end of the energy storage inductor $L_{mi0}$, the other end of the energy storage inductor $L_{mi0}$ is connected with one end of a secondary side of the high-frequency transformer $T_{mi}$, a source electrode of the switch tube $Q_{mi3}$ is connected with a drain electrode of the switch tube $Q_{mi4}$, and a connection point thereof is connected with the other end of a primary side of the high-frequency transformer $T_{mi}$. The two bridge arms of the primary side controllable rectifier bridge are connected in parallel with the direct current-side filter capacitor $C_{mi0}$ of the H-bridge converter.

In the two bridge arms of the secondary side controllable rectifier bridge, the switch tube $Q_{mi5}$ and the switch tube $Q_{mi6}$ are connected in series to form one bridge arm, the switch tube $Q_{mi3}$ and the switch tube $Q_{mi4}$ are connected in series to form the other bridge arm. Specifically, a source electrode of the switch tube $Q_{mi7}$ is connected with a drain electrode of the switch tube $Q_{mi8}$, and a connection point thereof is connected with one end of the secondary side of the high-frequency transformer $T_{mi}$, the source electrode of the switch tube $Q_{mi7}$ is connected with the drain electrode of the switch tube $Q_{mi8}$, and a connection point thereof is connected with the other end of the secondary side of the high-frequency transformer $T_{mi}$.

The direct current bus filter capacitor $C_{mi1}$ is connected in parallel at an output side of the secondary side controllable inverter bridge, and a positive electrode and a negative electrode of the direct current bus filter capacitor $C_{mi1}$ form the direct current output port of the module 1mi.

Preferably, the isolated DC/DC converter is an Logical Link Control (LLC) resonant converter. A circuit topological structure of the LLC resonant converter sequentially includes a primary side inverter bridge, an excitation inductor $L_{mi0}$, a resonant inductor $L_{mi1}$, a resonant capacitor $C_{mi2}$, a high-frequency isolation transformer $T_{mi}$, a secondary side uncontrolled rectifier bridge and a direct current bus filter capacitor $C_{mi1}$ from input to output.

The primary side inverter bridge is formed by two bridge arms connected in parallel, each of the two bridge arms of the primary side inverter bridge includes two switch tubes with anti-parallel diodes, such that the primary side inverter bridge includes four switch tubes with anti-parallel diodes in total, and the four switch tubes are marked as switch tubes $Q_{mij}$. Each switch tube $Q_{mij}$ in the primary side inverter bridge is connected in parallel with one parasitic capacitor. The secondary side uncontrolled rectifier bridge is formed by two bridge arms connected in parallel, each of the two bridge arms of the secondary side uncontrolled rectifier bridge includes two diodes, such that the secondary side uncontrolled rectifier bridge includes four diodes in total, and the four diodes are marked as diodes $D_{mij}$.

In the two bridge arms of the primary side inverter bridge, the switch tube $Q_{mi1}$ and the switch tube $Q_{mi2}$ form one bridge arm, the switch tube $Q_{mi3}$ and the switch tube $Q_{mi4}$ form the other bridge arm. Specifically, a source electrode of the switch tube $Q_{mi1}$ is connected with a drain electrode of the switch tube $Q_{mi2}$, a connection point thereof is marked as point $\sigma_{mi3}$, a source electrode of the switch tube $Q_{mi3}$ is connected with a drain electrode of the switch tube $Q_{mi4}$, and a connection point thereof is marked as point $\sigma_{mi4}$. The resonant capacitor $C_{mi2}$ is connected in series between the point $\sigma_{mi3}$ and the resonant inductor $L_{mi1}$, and the other end of the resonant inductor $L_{mi1}$ is connected with one end of a primary side of the high-frequency transformer $T_{mi}$. The other end of a secondary side of the high-frequency transformer $T_{mi}$ is connected with the point $\sigma_{mi4}$. The excitation inductor $L_{mi0}$ is connected in parallel with the primary side of the high-frequency transformer $T_{mi}$. The two bridge arms of the primary side inverter bridge are connected in parallel with the direct current-side filter capacitor $C_{mi0}$ of the H-bridge converter.

In the two bridge arms of the secondary side uncontrolled rectifier bridge, the diode $D_{mi1}$ and the diode $D_{mi2}$ form one bridge arm, the diode $D_{mi3}$ and the diode $D_{mi4}$ form the other bridge arm. Specifically, an anode of the diode $D_{mi1}$ is connected with a cathode of diode $D_{mi2}$, a connection point thereof is connected with one end of the secondary side of high-frequency transformer $T_{mi}$, an anode of the diode $D_{mi3}$ is connected with a cathode of the diode $D_{mi4}$, and a connection point thereof is connected with the other end of the secondary side of the high-frequency transformer $T_{mi}$.

The direct current bus filter capacitor $C_{mi1}$ is connected in parallel with an output side of the secondary side uncontrolled rectifier bridge, and a positive electrode and a negative electrode of the direct current bus filter capacitor $C_{mi1}$ form the direct current output port of the module $\Gamma_{mi}$.

Preferably, the non-isolated DC/DC converter in the emergency power supply system is a Buck-Boost bidirectional non-isolated DC/DC converter, and the topological structure includes two switch tubes $S_{DC1}$ and $S_{DC2}$ with anti-parallel diodes, an inductor $L_{DC}$, an input capacitor $C_{DC1}$ and an output capacitor $C_{DC2}$.

In the Buck-Boost bidirectional non-isolated DC/DC converter, the switch tube $S_{DC1}$ and the switch tube $S_{DC2}$ form one bridge arm, a source electrode of the switch tube $S_{DC1}$ is connected with a drain electrode of the switch tube $S_{DC2}$, and a connection point thereof is marked as point $\sigma_{DC}$. An input side of the bridge arm formed by the switch tube $S_{DC1}$ and the switch tube $S_{DC2}$ is connected in parallel with the input capacitor $C_{DC1}$, one end of the inductor $L_{DC}$ is connected with the point $\sigma_{DC}$, the other end of the inductor $L_{DC}$ is connected with a positive electrode of the output capacitor $C_{DC2}$, and a negative electrode of the output capacitor $C_{DC2}$ is connected with a source electrode of the switch tube $S_{DC2}$.

Compared with the prior art, the present invention has the following beneficial effects:

1. The direct current load power supply system in a subway station based on the cascaded modular medium-voltage converter is provided to replace the alternating current load power supply system based on the power frequency step-down transformer, so as to improve the efficiency and power density of the load power supply system in the subway station, reduce the no-load loss and additional cost introduced by the power frequency transformer, and then achieve the purposes of energy saving, emission reduction and cost saving. Still taking the subway lines with 20 platforms as an example, the annual power saving can reach about $1613*10^4$ kWh/year (16.13 million kWh), which has considerable economic benefits and also saves more than about 20% of the funds invested by the subway in transformer substation and load devices.

2. With the provided direct current load power supply system in the subway station, for the electric loads, the alternating current power supply can be replaced by the direct current power supply, which can save the uncontrolled rectifier circuit and power factor correction circuit compared with the existing electric loads and save the system cost.

3. The power factor correction in the station is completed by controlling the cascaded modular medium-voltage converter, thereby replacing the existing SVG apparatuses and further reducing the investment cost of the subway station.

DESCRIPTION OF THE EMBODIMENTS

The present invention will be further described clearly and completely in combination with the accompanying drawings and embodiments.

Figure 1:
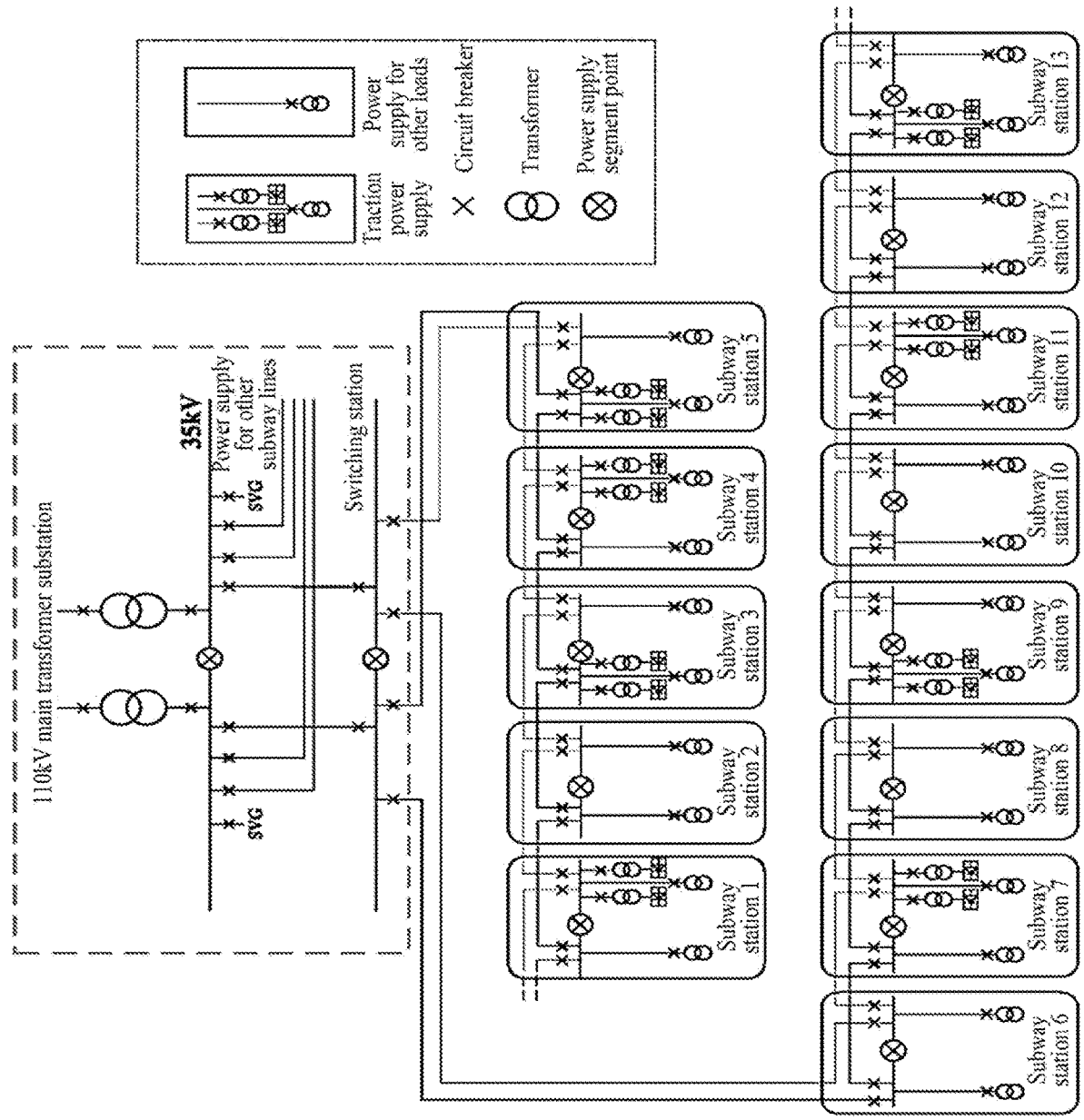
FIG. 1 is a schematic diagram of an alternating current power supply system for loads in a station based on a power frequency step-down transformer currently used in a subway station.
Figure 2:
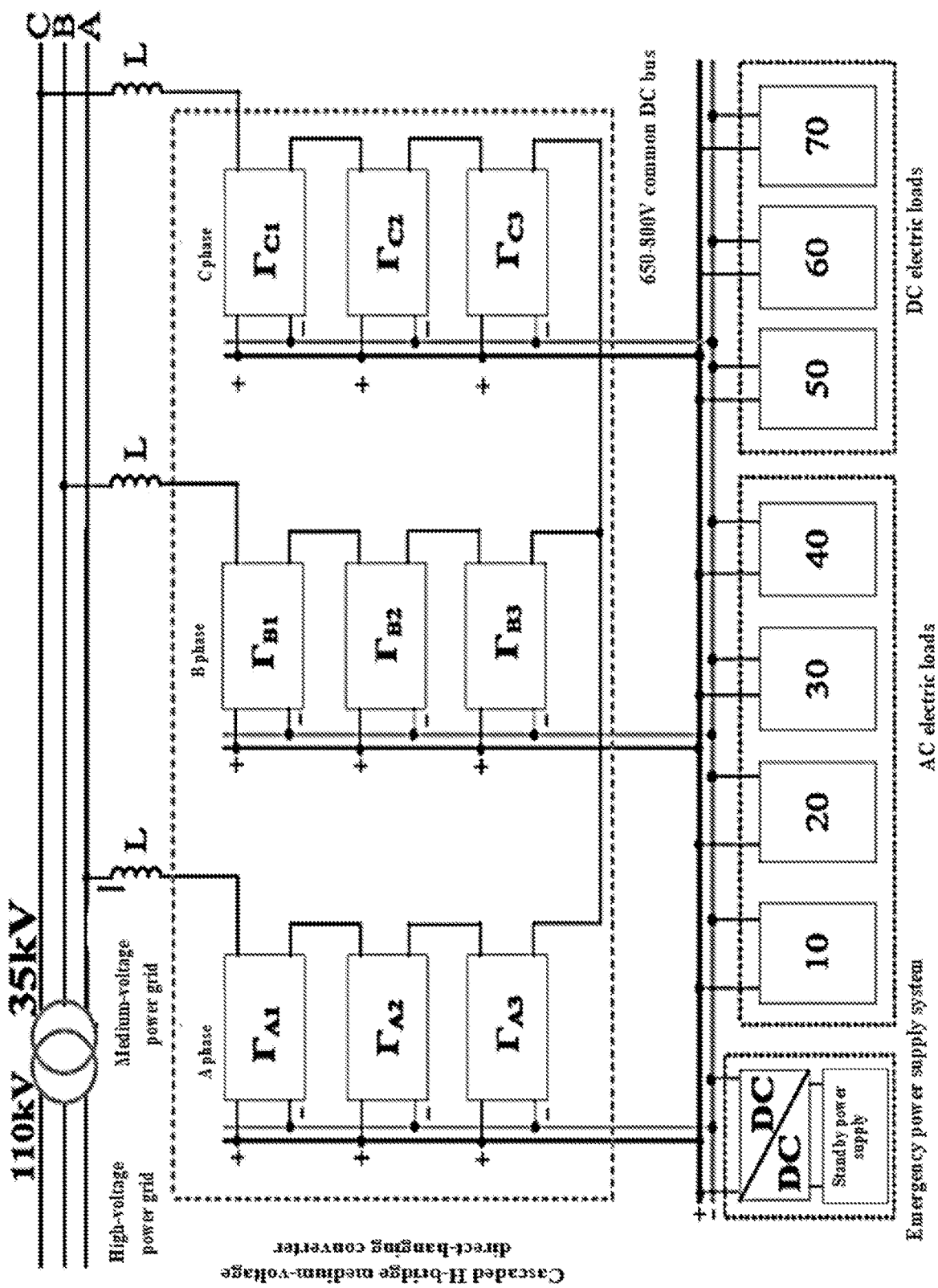
FIG. 2 is a circuit diagram of a direct current power supply system for loads in a subway station based on a cascaded modular medium-voltage direct-hanging converter according to the present invention.

FIG. 2 is a circuit diagram of a direct current power supply system for urban rail transit cascaded direct-hanging stations. As can be seen from the figure, the direct current distribution system for urban rail transit cascaded direct-hanging stations according to the present invention includes a 110 kV high-voltage power grid, a 35 kV medium-voltage power grid, three identical filter inductors L, a cascaded H-bridge medium-voltage direct-hanging converter, a 650V-800V common direct current bus, an emergency power supply system and an electric load in the subway station; a step-down transformer is installed between the 110 kV high-voltage power grid and the 35 kV medium-voltage power grid, and a standby power supply and direct current electric loads are respectively connected with the 650V-800V common direct current bus.

The cascaded H-bridge medium-voltage direct-hanging converter is divided into three phases with the same structure, which are respectively marked as an A-phase cascaded H-bridge medium-voltage direct-hanging converter, a B-phase cascaded H-bridge medium-voltage direct-hanging converter and a C-phase cascaded H-bridge medium-voltage direct-hanging converter; each phase of the A-phase cascaded H-bridge medium-voltage direct-hanging converter, the B-phase cascaded H-bridge medium-voltage direct-hanging converter and the C-phase cascaded H-bridge medium-voltage direct-hanging converter includes n modules $\Gamma_{mi}$ with the same structure, that is, the cascaded H-bridge medium-voltage direct-hanging converter includes 3n modules $\Gamma_{mi}$ with the same structure in total, wherein m represents a phase sequence, m=A, B, C, i represents a serial number of the module $\Gamma_{mi}$, i=1, 2, 3 . . . n, and n is a positive integer greater than 1.

The module $\Gamma_{mi}$ is formed by one H-bridge converter and one isolated DC/DC converter connected in series, and one direct current-side filter capacitor $C_{mi0}$ of the H-bridge converter is connected in parallel at a direct current output end of the H-bridge converter.

The H-bridge converter is formed by two bridge arms connected in parallel, each bridge arm includes two switch tubes with anti-parallel diodes, such that the H-bridge converter includes four switch tubes with anti-parallel diodes in total, and these four switch tubes are marked as switch tubes $S_{mij}$, wherein j represents a serial number of the switch tube, and j=1, 2, 3, 4; in the two bridge arms of the H-bridge converter, a source electrode of the switch tube $S_{mi1}$ is connected with a drain electrode of the switch tube $S_{mi2}$, and a connection point thereof is marked as point $\sigma_{mi1}$; a source electrode of the switch tube $S_{mi3}$ is connected with a drain electrode of the switch tube $S_{mi4}$, a connection point thereof is marked as point $\sigma_{mi2}$, and the points amu and $\sigma_{mi2}$ form an alternating current input end of the module $\Gamma_{mi}$.

In each phase of the cascaded H-bridge medium-voltage direct-hanging converter, the alternating current input ends of n modules $\Gamma_{mi}$ are cascaded, such that in the cascaded H-bridge medium-voltage direct-hanging converter, three module strings formed by n modules $\Gamma_{mi}$ are formed, certain ends of the three module strings are connected together to form a common point, and the other ends of the module strings are respectively connected with the three-phase star-connected 35 kV medium-voltage power grid through one filter inductor L.

In the cascaded H-bridge medium-voltage direct-hanging converter, direct current output ports of 3n modules $\Gamma_{mi}$ are connected in parallel to form one 650V-800V common direct current bus.

The electric loads in the subway station include alternating current loads and direct current loads, the alternating current loads at least include a ventilation and air conditioning system 10, a water supply and drainage system 20, a firefighting system 30 and an escalator system (40), and the direct current loads at least include a communication and information system 50, an operation control system 60 and an in-station lighting system 70; input ends of the ventilation and air conditioning system 10, the water supply and drainage system 20, the firefighting system 30 and the escalator system 40 are respectively connected with the 650V-800V common direct current bus, and respectively convert direct current into alternating current by self-contained frequency modulation control apparatuses for operation; input ends of the communication and information system 50, the operation control system 60 and the in-station lighting system 70 are respectively connected with the 650V-800V common direct current bus, and are respectively supplied with power through self-contained direct current converters.

The emergency power supply system includes a non-isolated DC/DC converter and a standby power supply, wherein an output end of the non-isolated DC/DC converter is connected with the 650-800 V common direct current bus, and an input end of the non-isolated DC/DC converter is connected with an output end of the standby power supply.

As can be seen from FIG. 2, n=3 in the present embodiment. In addition, the topological structures of the modules $\Gamma_{mi}$ and the H-bridge converter can be seen in FIG. 3 and FIG. 4.

Figure 3:
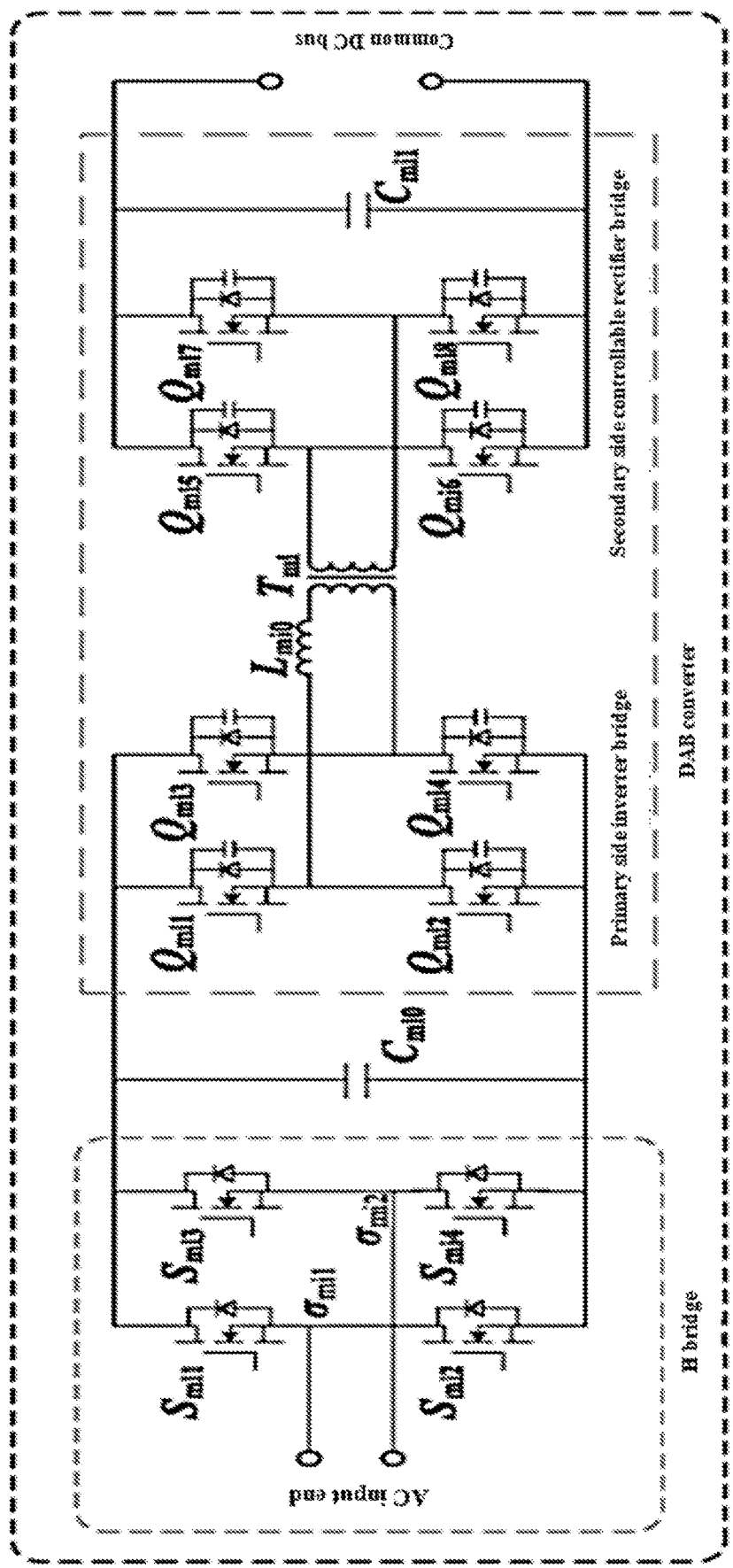
FIG. 3 is a topological diagram of modules $\Gamma_{mi}$ when an isolated DC/DC converter adopts a DAB converter in an embodiment of the present invention.

In the present embodiment, the isolated DC/DC converter is a DAB converter. FIG. 3 shows a topological diagram of the modules $\Gamma_{mi}$ when the isolated DC/DC converter adopts the DAB converter. As can be seen from FIG. 3, the circuit topological structure of the DAB converter sequentially includes a primary side inverter bridge, an energy storage inductor $L_{mi0}$, a high-frequency isolation transformer $T_{mi}$, a secondary side controllable rectifier bridge and a direct current bus filter capacitor $C_{mi1}$ from input to output.

The primary side inverter bridge is formed by two bridge arms connected in parallel, each bridge arm includes two switch tubes with anti-parallel diodes, such that the primary side inverter bridge includes four switch tubes with anti-parallel diodes in total, and the four switch tubes are marked as switch tubes $Q_{mij}$; the secondary side controllable rectifier bridge is formed by two bridge arms connected in parallel, each bridge arm includes two switch tubes with anti-parallel diodes, such that the secondary inverter bridge includes four switch tubes with anti-parallel diodes in total, and the four switch tubes are marked as switch tubes $Q_{mih}$, wherein h is a serial number of the switch tube, and h=5, 6, 7, 8; each switch tube $Q_{mij}$ in the primary side inverter bridge is connected in parallel with one parasitic capacitor; each switch tube $Q_{mih}$ in the secondary side controllable rectifier bridge is connected in parallel with one parasitic capacitor.

In the two bridge arms of the primary side inverter bridge, the switch tube $Q_{mi1}$ and the switch tube $Q_{mi2}$ are connected in series to form one bridge arm, the switch tube $Q_{mi3}$ and the switch tube $Q_{mi4}$ are connected in series to form the other bridge arm, specifically, a source electrode of the switch tube $Q_{mi1}$ is connected with a drain electrode of the switch tube $Q_{mi2}$, a connection point thereof is connected with one end of the energy storage inductor $L_{mi0}$, the other end of the energy storage inductor $L_{mi0}$ is connected with one end of a secondary side of the high-frequency transformer $T_{mi}$, a source electrode of the switch tube $Q_{mi3}$ is connected with a drain electrode of the switch tube $Q_{mi4}$, and a connection point thereof is connected with the other end of a primary side of the high-frequency transformer $T_{mi}$; the two bridge arms of the primary side controllable rectifier bridge are connected in parallel with the direct current-side filter capacitor $C_{mi0}$ of the H-bridge converter.

In the two bridge arms of the secondary side controllable rectifier bridge, the switch tube $Q_{mi5}$ and the switch tube $Q_{mi6}$ are connected in series to form one bridge arm, the switch tube $Q_{mi3}$ and the switch tube $Q_{mi4}$ are connected in series to form the other bridge arm, specifically, a source electrode of the switch tube $Q_{mi7}$ is connected with a drain electrode of the switch tube $Q_{mi8}$, and a connection point thereof is connected with one end of the secondary side of the high-frequency transformer $T_{mi}$, the source electrode of the switch tube $Q_{mi7}$ is connected with the drain electrode of the switch tube $Q_{mi8}$, and a connection point thereof is connected with the other end of the secondary side of the high-frequency transformer $T_{mi}$.

The direct current bus filter capacitor $C_{mi1}$ is connected in parallel at an output side of the secondary side controllable inverter bridge, and a positive electrode and a negative electrode of the direct current bus filter capacitor $C_{mi1}$ form the direct current output port of the module $\Gamma_{mi}$.

Figure 4:
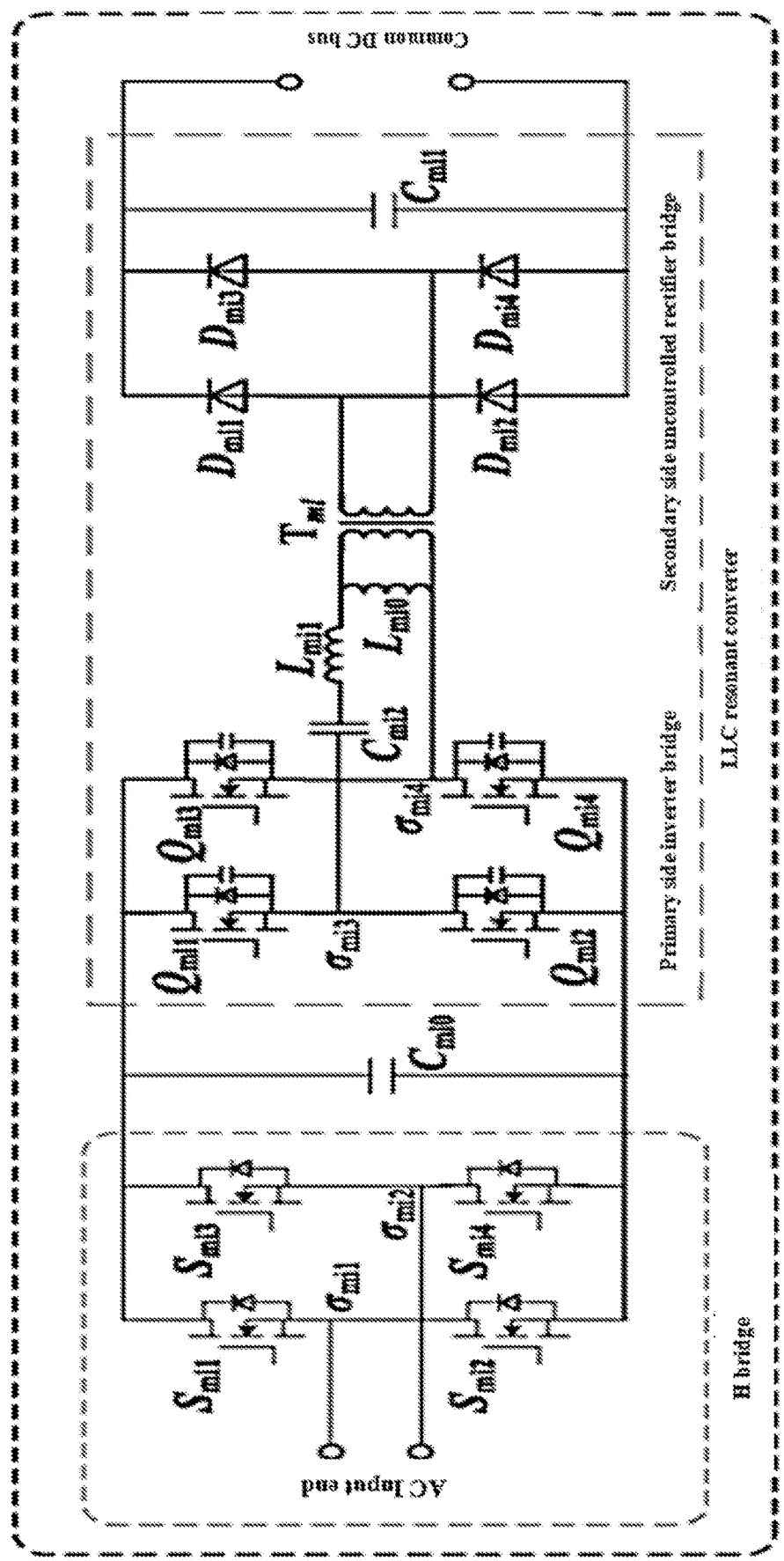
FIG. 4 is a topological diagram of modules $\Gamma_{mi}$ when an isolated DC/DC converter adopts an LLC resonant converter in an embodiment of the present invention.

In the present embodiment, the isolated DC/DC converter is an LLC resonant converter. FIG. 4 shows a topological diagram of the modules $\Gamma_{mi}$ when the isolated DC/DC converter adopts the LLC resonant converter. As can be seen from FIG. 4, the circuit topological structure of the LLC resonant converter sequentially includes a primary side inverter bridge, an excitation inductor $L_{mi0}$, a resonant inductor $L_{mi1}$, a resonant capacitor $C_{mi2}$, a high-frequency isolation transformer $T_{mi}$, a secondary side uncontrolled rectifier bridge and a direct current bus filter capacitor $C_{mi1}$ from input to output.

The primary side inverter bridge is formed by two bridge arms connected in parallel, each bridge arm includes two switch tubes with anti-parallel diodes, such that the primary side inverter bridge includes four switch tubes with anti-parallel diodes in total, and the four switch tubes are marked as switch tubes $Q_{mij}$; each switch tube $Q_{mij}$ in the primary side inverter bridge is connected in parallel with one parasitic capacitor; the secondary side uncontrolled rectifier bridge is formed by two bridge arms connected in parallel, each bridge arm includes two diodes, such that the secondary side uncontrolled rectifier bridge includes four diodes in total, and the four diodes are marked as diodes $D_{mij}$.

In the two bridge arms of the primary side inverter bridge, the switch tube $Q_{mi1}$ and the switch tube $Q_{mi2}$ form one bridge arm, the switch tube $Q_{mi3}$ and the switch tube $Q_{mi4}$ form the other bridge arm, specifically, a source electrode of the switch tube $Q_{mi1}$ is connected with a drain electrode of the switch tube $Q_{mi2}$, a connection point thereof is marked as point $\sigma_{mi3}$, a source electrode of the switch tube $Q_{mi3}$ is connected with a drain electrode of the switch tube $Q_{mi4}$, and a connection point thereof is marked as point $\sigma_{mi4}$; the resonant capacitor $C_{mi2}$ is connected in series between the point $\sigma_{mi3}$ and the resonant inductor $L_{mi1}$, and the other end of the resonant inductor $L_{mi3}$ is connected with one end of a primary side of the high-frequency transformer $T_{mi}$; the other end of a secondary side of the high-frequency transformer $T_{mi}$ is connected with the point $\sigma_{mi4}$; the excitation inductor $L_{mi0}$ is connected in parallel with the primary side of the high-frequency transformer $T_{mi}$; the two bridge arms of the primary side inverter bridge are connected in parallel with the direct current-side filter capacitor $C_{mi0}$ of the H-bridge converter.

In the two bridge arms of the secondary side uncontrolled rectifier bridge, the diode $D_{mi1}$ and the diode $D_{mi2}$ form one bridge arm, the diode $D_{mi3}$ and the diode $D_{mi4}$ form the other bridge arm, specifically, an anode of the diode $D_{mi1}$ is connected with a cathode of diode $D_{mi2}$, a connection point thereof is connected with one end of the secondary side of high-frequency transformer $T_{mi}$, an anode of the diode $D_{mi3}$ is connected with a cathode of the diode $D_{mi4}$, and a connection point thereof is connected with the other end of the secondary side of the high-frequency transformer $T_{mi}$.

The direct current bus filter capacitor $C_{mi1}$ is connected in parallel with an output side of the secondary side uncontrolled rectifier bridge, and a positive electrode and a negative electrode of the direct current bus filter capacitor $C_{mi1}$ form the direct current output port of the module $\Gamma_{mi}$.

Figure 5:
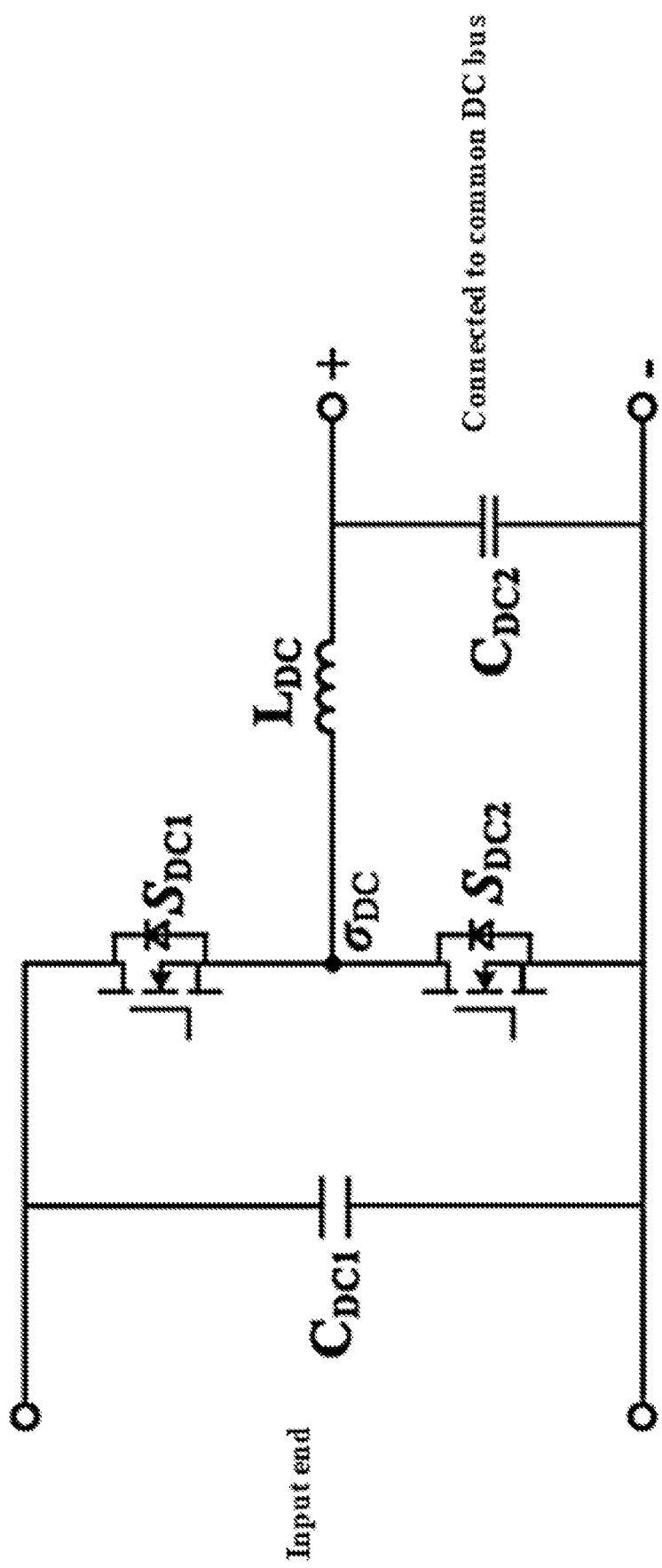
FIG. 5 is a topological diagram of a Buck-Boost bidirectional non-isolated DC/DC converter in the present embodiment.

In the present embodiment, the DC/DC converter in the emergency power supply system is a Buck-Boost bidirectional non-isolated DC/DC converter. FIG. 5 shows a topological diagram of the Buck-Boost bidirectional non-isolated DC/DC converter. As can be seen from FIG. 5, the topological structure of the Buck-Boost bidirectional non-isolated DC/DC converter includes two switch tubes $S_{DC1}$ and $S_{DC2}$ with anti-parallel diodes, an inductor $L_{DC}$, an input capacitor $C_{DC1}$ and an output capacitor $C_{DC2}$.

In the Buck-Boost bidirectional non-isolated DC/DC converter, the switch tube $S_{DC1}$ and the switch tube $S_{DC2}$ form one bridge arm, a source electrode of the switch tube $S_{DC1}$ is connected with a drain electrode of the switch tube $S_{DC2}$, and a connection point thereof is marked as point $\sigma_{DC}$; an input side of the bridge arm formed by the switch tube $S_{DC1}$ and the switch tube $S_{DC2}$ is connected in parallel with the input capacitor $C_{DC1}$, one end of the inductor $L_{DC}$ is connected with the point $\sigma_{DC}$, the other end of the inductor $L_{DC}$ is connected with a positive electrode of the output capacitor $C_{DC2}$, and a negative electrode of the output capacitor $C_{DC2}$ is connected with a source electrode of the switch tube $S_{DC2}$.

Figure 6:
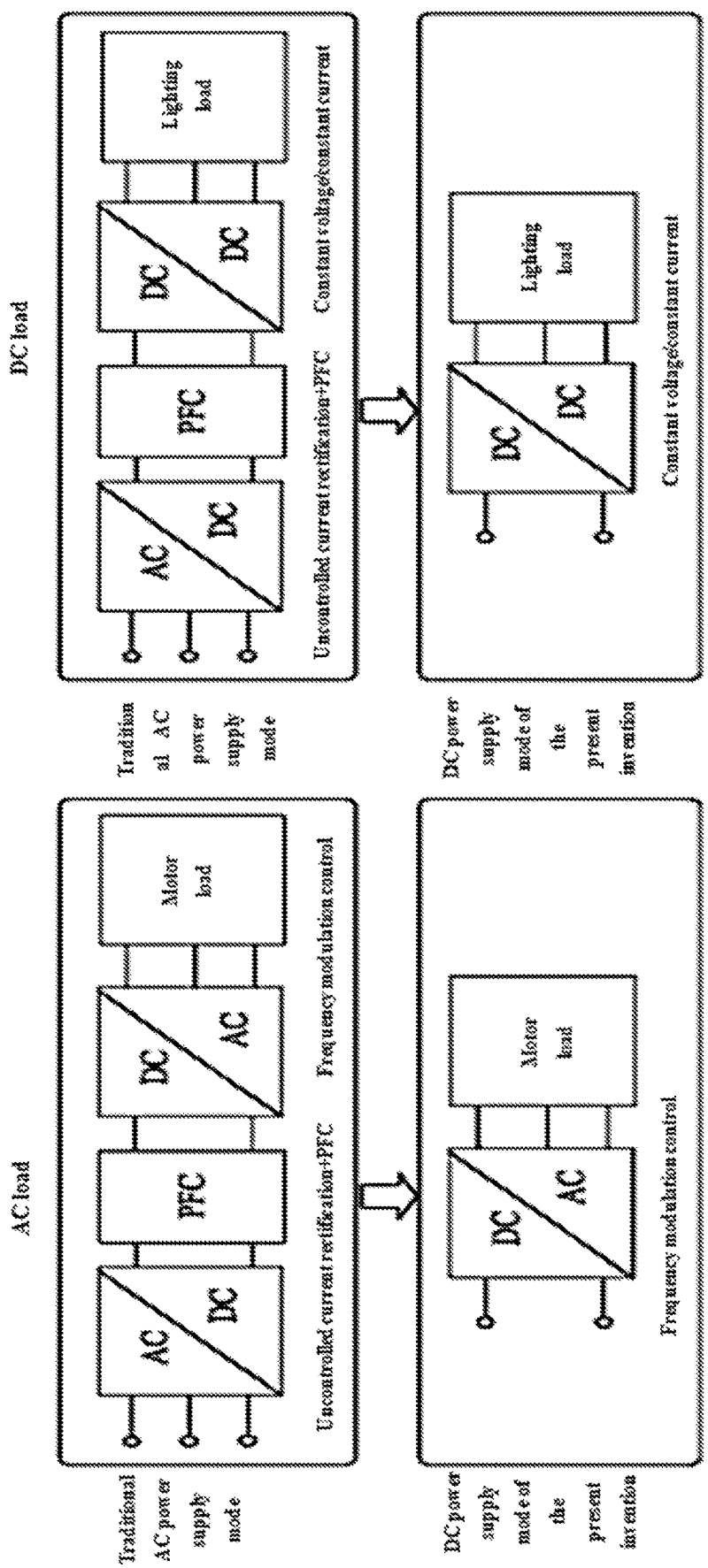
FIG. 6 is a comparison diagram between a traditional alternating current power supply mode and a direct current power supply mode according to the present invention.

FIG. 6 shows the comparison between a traditional alternating current power supply mode for loads in a station and the direct current power supply mode for loads in a station according to the present invention. It can be seen from FIG. 2 that by adopting the direct current load power supply system according to the present invention, alternating current electric energy has been converted into direct current electric energy through the cascaded modular medium-voltage direct-hanging converter at the previous stage, unit power factor control can be realized, and electrical devices need no rectification and power factor correction any more. Therefore, only the uncontrolled rectifier circuit and the PFC circuit at the previous stage in the existing device need to be removed, and only the converters at the later stage are reserved. For example, only the DC/AC converter is reserved for a ventilation air conditioner and a water pump to drive a motor through frequency modulation control, and the DC/DC converter is reserved for lighting and information systems to supply power to the device through constant voltage or constant current control.

What is claimed is:

1. A power supply system for urban rail transit cascaded direct-hanging stations, wherein the power supply system comprises a 110 kV high-voltage power grid, a 35 kV medium-voltage power grid, three identical filter inductors L, a cascaded H-bridge medium-voltage direct-hanging converter, a 650V-800V common direct current bus, an emergency power supply system and electric loads in a subway station, wherein a step-down transformer is installed between the 110 kV high-voltage power grid and the 35 kV medium-voltage power grid, wherein the cascaded H-bridge medium-voltage direct-hanging converter is divided into three phases with the same structure, which are respectively marked as an A-phase cascaded H-bridge medium-voltage direct-hanging converter, a B-phase cascaded H-bridge medium-voltage direct-hanging converter and a C-phase cascaded H-bridge medium-voltage direct-hanging converter, wherein each phase of the A-phase cascaded H-bridge medium-voltage direct-hanging converter, the B-phase cascaded H-bridge medium-voltage direct-hanging converter and the C-phase cascaded H-bridge medium-voltage direct-hanging converter comprises n modules $\Gamma_{mi}$ with the same structure, such that the cascaded H-bridge medium-voltage direct-hanging converter comprises 3n modules $\Gamma_{mi}$ with the same structure in total, wherein m represents a phase sequence, m=A, B, C, i represents a serial number of the modules $\Gamma_{mi}$, i=1, 2, 3 ... n, and n is a positive integer greater than 1, wherein each of the modules $\Gamma_{mi}$ is formed by an H-bridge converter and an isolated DC/DC converter connected in series, and a direct current-side filter capacitor $C_{mi0}$ of the H-bridge converter is connected in parallel at a direct current output end of the H-bridge converter, wherein the H-bridge converter is formed by two bridge arms connected in parallel, each bridge arm comprises two switch tubes with anti-parallel diodes, such that the H-bridge converter comprises four switch tubes with anti-parallel diodes in total, and the four switch tubes are marked as switch tubes $S_{mij}$, wherein j represents a serial number of the switch tube, and j=1, 2, 3, 4, wherein in the two bridge arms of the H-bridge converter, a source electrode of the switch tube $S_{mi1}$ is connected with a drain electrode of the switch tube $S_{mi2}$, and a connection point of the source electrode of the switch tube $S_{mi1}$ and the drain electrode of the switch tube $S_{mi2}$ is marked as point $\sigma_{mi1}$, wherein a source electrode of the switch tube $S_{mi3}$ is connected with a drain electrode of the switch tube $S_{mi4}$, a connection point of the source electrode of the switch tube $S_{mi3}$ and the drain electrode of the switch tube $S_{mi4}$ is marked as point $\sigma_{mi2}$, and the points $\sigma_{mi1}$ and $\sigma_{mi2}$ form an alternating current input end of each of the modules $\Gamma_{mi}$, wherein in each phase of the cascaded H-bridge medium-voltage direct-hanging converter, the alternating current input ends of n modules $\Gamma_{mi}$ are cascaded, such that in the cascaded H-bridge medium-voltage direct-hanging converter, three module strings formed by the n modules $\Gamma_{mi}$ are formed, certain ends of the three module strings are connected together to form a common point, and the other ends of the module strings are respectively connected with the 35 kV medium-voltage power grid that is three-phase star-connected through one filter inductor L, wherein in the cascaded H-bridge medium-voltage direct-hanging converter, direct current output ports of the 3n modules $\Gamma_{mi}$ are connected in parallel to form one 650V-800V common direct current bus, wherein the electric loads in the subway station comprise alternating current loads and direct current loads, wherein the alternating current loads at least comprise a ventilation and air conditioning system, a water supply and drainage system, a firefighting system and an escalator system, and the direct current loads at least comprise a communication and information system, an operation control system and an in-station lighting system, wherein input ends of the ventilation and air conditioning system, the water supply and drainage system, the firefighting system and the escalator system are respectively connected with the 650V-800V common direct current bus, and respectively convert direct current into alternating current by self-contained frequency modulation control apparatuses for operation, wherein input ends of the communication and information system, the operation control system and the in-station lighting system are respectively connected with the 650V-800V common direct current bus, and are respectively supplied with power through self-contained direct current converters, wherein the emergency power supply system comprises a non-isolated DC/DC converter and a standby power supply, wherein an output end of the non-isolated DC/DC converter is connected with the 650-800 V common direct current bus, and an input end of the non-isolated DC/DC converter is connected with an output end of the standby power supply.

2. The power supply system for urban rail transit cascaded direct-hanging stations according to claim 1, wherein the isolated DC/DC converter is a DAB converter, wherein a circuit topological structure of the DAB converter sequentially comprises a primary side inverter bridge, an energy storage inductor $L_{mi0}$, a high-frequency isolation transformer $T_{mi}$, a secondary side controllable rectifier bridge and a direct current bus filter capacitor $C_{mi1}$ from input to output, wherein the primary side inverter bridge is formed by two bridge arms connected in parallel, each of the two bridge arms of the primary side inverter bridge comprises two switch tubes with anti-parallel diodes, such that the primary side inverter bridge comprises four switch tubes with anti-parallel diodes in total, and the four switch tubes are marked as switch tubes $Q_{mij}$, wherein the secondary side controllable rectifier bridge is formed by two bridge arms connected in parallel, each of the two bridge arms of the secondary side controllable rectifier bridge comprises two switch tubes with anti-parallel diodes, such that the secondary inverter bridge comprises four switch tubes with anti-parallel diodes in total, and the four switch tubes are marked as switch tubes $Q_{mih}$, wherein h is a serial number of the switch tube, and h=5, 6, 7, 8, wherein each switch tube $Q_{mij}$ in the primary side inverter bridge is connected in parallel with one parasitic capacitor, wherein each switch tube $Q_{mih}$ in the secondary side controllable rectifier bridge is connected in parallel with one parasitic capacitor, wherein in the two bridge arms of the primary side inverter bridge, the switch tube $Q_{mi1}$ and the switch tube $Q_{mi2}$ are connected in series to form one bridge arm, the switch tube $Q_{mi3}$ and the switch tube $Q_{mi4}$ are connected in series to form the other bridge arm, wherein a source electrode of the switch tube $Q_{mi1}$ is connected with a drain electrode of the switch tube $Q_{mi2}$, a connection point thereof is connected with one end of the energy storage inductor $L_{mi0}$, the other end of the energy storage inductor $L_{mi0}$ is connected with one end of a secondary side of the high-frequency transformer $T_{mi}$, a source electrode of the switch tube $Q_{mi3}$ is connected with a drain electrode of the switch tube $Q_{mi4}$, and a connection point thereof is connected with the other end of a primary side of the high-frequency transformer $T_{mi}$, wherein the two bridge arms of the primary side controllable rectifier bridge are connected in parallel with the direct current-side filter capacitor $C_{mi0}$ of the H-bridge converter, wherein in the two bridge arms of the secondary side controllable rectifier bridge, the switch tube $Q_{mi5}$ and the switch tube $Q_{mi6}$ are connected in series to form one bridge arm, the switch tube $Q_{mi3}$ and the switch tube $Q_{mi4}$ are connected in series to form the other bridge arm, wherein a source electrode of the switch tube $Q_{mi7}$ is connected with a drain electrode of the switch tube $Q_{mi8}$, and a connection point thereof is connected with one end of the secondary side of the high-frequency transformer $T_{mi}$, the source electrode of the switch tube $Q_{mi7}$ is connected with the drain electrode of the switch tube $Q_{mi8}$, and a connection point thereof is connected with the other end of the secondary side of the high-frequency transformer $T_{mi}$, wherein the direct current bus filter capacitor $C_{mi1}$ is connected in parallel at an output side of the secondary side controllable inverter bridge, and a positive electrode and a negative electrode of the direct current bus filter capacitor $C_{mi1}$ form the direct current output port of the module $\Gamma_{mi}$.

3. The power supply system for urban rail transit cascaded direct-hanging stations according to claim 1, wherein the isolated DC/DC converter is an LLC resonant converter, wherein a circuit topological structure of the LLC resonant converter sequentially comprises a primary side inverter bridge, an excitation inductor $L_{mi0}$, a resonant inductor $L_{mi1}$, a resonant capacitor $C_{mi2}$, a high-frequency isolation transformer $T_{mi}$, a secondary side uncontrolled rectifier bridge and a direct current bus filter capacitor $C_{mi1}$ from input to output, wherein the primary side inverter bridge is formed by two bridge arms connected in parallel, each of the two bridge arms of the primary side inverter bridge comprises two switch tubes with anti-parallel diodes, such that the primary side inverter bridge comprises four switch tubes with anti-parallel diodes in total, and the four switch tubes are marked as switch tubes $Q_{mij}$, wherein each switch tube $Q_{mij}$ in the primary side inverter bridge is connected in parallel with one parasitic capacitor, wherein the secondary side uncontrolled rectifier bridge is formed by two bridge arms connected in parallel, each of the two bridge arms of the secondary side uncontrolled rectifier bridge comprises two diodes, such that the secondary side uncontrolled rectifier bridge comprises four diodes in total, and the four diodes are marked as diodes $D_{mij}$, wherein in the two bridge arms of the primary side inverter bridge, the switch tube $Q_{mi1}$ and the switch tube $Q_{mi2}$ form one bridge arm, the switch tube $Q_{mi3}$ and the switch tube $Q_{mi4}$ form the other bridge arm, wherein a source electrode of the switch tube $Q_{mi1}$ is connected with a drain electrode of the switch tube $Q_{mi2}$, a connection point thereof is marked as point $\sigma_{mi3}$, a source electrode of the switch tube $Q_{mi3}$ is connected with a drain electrode of the switch tube $Q_{mi4}$, and a connection point thereof is marked as point $\sigma_{mi4}$, wherein the resonant capacitor $C_{mi2}$ is connected in series between the point $\sigma_{mi3}$ and the resonant inductor $L_{mi1}$, and the other end of the resonant inductor $L_{mi1}$ is connected with one end of a primary side of the high-frequency transformer $T_{mi}$, wherein the other end of a secondary side of the high-frequency transformer $T_{mi}$ is connected with the point $\sigma_{mi4}$, wherein the excitation inductor $L_{mi0}$ is connected in parallel with the primary side of the high-frequency transformer $T_{mi}$, wherein the two bridge arms of the primary side inverter bridge are connected in parallel with the direct current-side filter capacitor $C_{mi0}$ of the H-bridge converter, wherein in the two bridge arms of the secondary side uncontrolled rectifier bridge, the diode $D_{mi1}$ and the diode $D_{mi2}$ form one bridge arm, the diode $D_{mi3}$ and the diode $D_{mi4}$ form the other bridge arm, wherein an anode of the diode $D_{mi1}$ is connected with a cathode of diode $D_{mi2}$, a connection point thereof is connected with one end of the secondary side of high-frequency transformer $T_{mi}$, an anode of the diode $D_{mi3}$ is connected with a cathode of the diode $D_{mi4}$, and a connection point thereof is connected with the other end of the secondary side of the high-frequency transformer $T_{mi}$, wherein the direct current bus filter capacitor $C_{mi1}$ is connected in parallel with an output side of the secondary side uncontrolled rectifier bridge, and a positive electrode and a negative electrode of the direct current bus filter capacitor $C_{mi1}$ form the direct current output port of the module $\Gamma_{mi}$.

4. The power supply system for urban rail transit cascaded direct-hanging stations according to claim 1, wherein the non-isolated DC/DC converter in the emergency power supply system is a Buck-Boost bidirectional non-isolated DC/DC converter, and the topological structure comprises two switch tubes $S_{DC1}$ and $S_{DC2}$ with anti-parallel diodes, an inductor $L_{DC}$, an input capacitor $C_{DC1}$ and an output capacitor $C_{DC2}$, wherein in the Buck-Boost bidirectional non-isolated DC/DC converter, the switch tube $S_{DC1}$ and the switch tube $S_{DC2}$ form one bridge arm, a source electrode of the switch tube $S_{DC1}$ is connected with a drain electrode of the switch tube $S_{DC2}$, and a connection point thereof is marked as point $\sigma_{DC}$, wherein an input side of the bridge arm formed by the switch tube $S_{DC1}$ and the switch tube $S_{DC2}$ is connected in parallel with the input capacitor $C_{DC1}$, one end of the inductor $L_{DC}$ is connected with the point $\sigma_{DC}$, the other end of the inductor $L_{DC}$ is connected with a positive electrode of the output capacitor $C_{DC2}$, and a negative electrode of the output capacitor $C_{DC2}$ is connected with a source electrode of the switch tube $S_{DC2}$.

\* \* \* \* \*